DONALD D. STELLMACHER
ROBERT C. DANTA
*INVENTORS*

BY
THEIR ATTORNEY

DONALD D. STELLMACHER
ROBERT C. DANTA
INVENTOR.

THEIR ATTORNEY

United States Patent Office
2,899,563
Patented Aug. 11, 1959

2,899,563

PROBE HOUSINGS FOR NUCLEAR RADIATION DETECTOR

Donald D. Stellmacher, Los Angeles, and Robert C. Danta, Inglewood, Calif., assignors to Hoffman Electronics Corporation, a corporation of California Application December 23, 1954, Serial No. 477,254

9 Claims. (Cl. 250—108)

This invention is related to probe housings which accommodate nuclear radiation detectors such as conventional Geiger tubes, and more particularly, to an improved probe housing design of which facilitates optimum sensitivity, ease of operation, and maximum protection for the enclosed radiation detecting device.

At the present time there are in manufacture Geiger tube probe housings of varying design which accommodate Geiger tubes and thus complement present-day portable Geiger counter units. It is of course desirable that probe housing designs provide maximum protection to the enclosed Geiger tube at all times, insure maximum shielding of the Geiger tube from beta radiation when beta differentiation from a beta-gamma radiating source is being made, facilitate operating ease in alternately exposing to a maximum degree or shielding the Geiger tube from ambient nuclear radiation, and, if desired, exhibit omni-directivity so as to assure maximum sensitivity. It is believed that probe housings as have been thus far designed leave a considerable degree of latitude in achieving the enhancement of the above enumerated features of optimum probe design.

Therefore, it is an object of the present invention to provide a new and useful probe housing for enclosing a nuclear radiation detecting device or Geiger tube associated therewith.

It is a further object of the present invention to provide a new and useful probe housing which will provide a maximum protection to the enclosed Geiger tube at all times, insure maximum shielding of the Geiger tube when a background count is taken, facilitate operating ease in alternately exposing or shielding the Geiger tube to ambient nuclear radiation, and lend itself to low-cost manufacture.

An additional object of the present invention is to provide a new and useful probe housing which may be adjusted for substantially full exposure of the Geiger tube and is omni-directional, thus insuring maximum sensitivity for the enclosed Geiger tube.

According to the present invention, a probe housing is composed principally of two hollow coaxial members, one member being slidably disposed over the other member in either of two opposite length-wise directions. In a preferred embodiment of this invention, both members have a cylindrical configuration, although elements of other cross-sections may be employed. The inside member is provided with side apertures so that when the outside member is withdrawn, these apertures will expose the enclosed Geiger tube to ambient radiation. To facilitate maximum exposure of the enclosed Geiger tube the side apertures of the inner member are longitudinal and closely spaced about the periphery of the inner member. The outer member serves as a handle for the probe whether or not the probe is in its exposed condition. In addition, the outer member and inner member have joint means to stop the movement of the outer member over the inner member when the extremities of travel, as determined by the "shielded" and "exposed" conditions of the probe, are reached.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
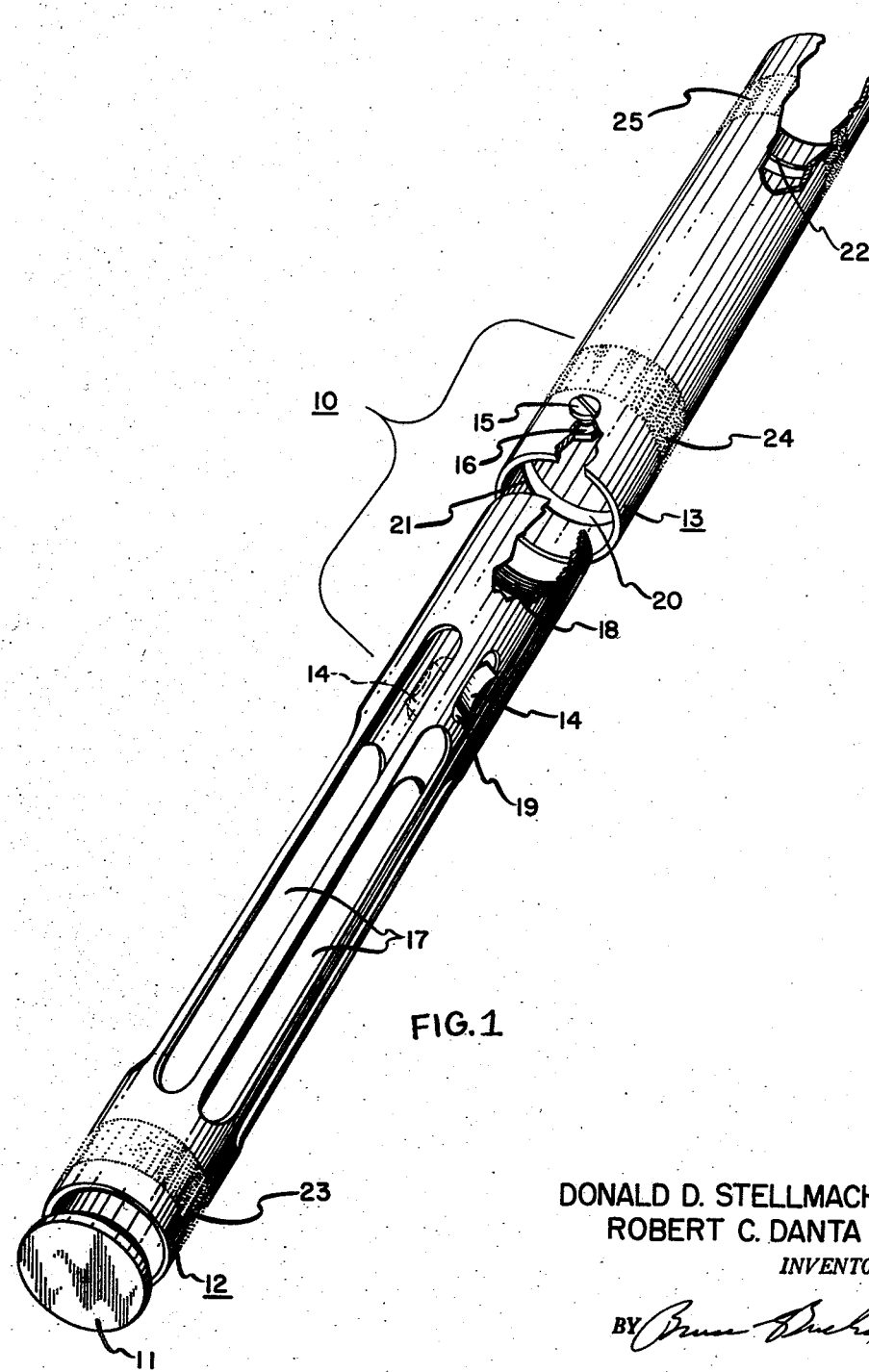
Figure 1 is an exploded view of a Geiger tube probe housing according to the present invention.

In Figure 1, which depicts a preferred embodiment of the present invention, probe housing assembly 10 consists of cap 11, inner cylindrical element 12, outer cylindrical element 13, two U-shaped springs 14, screw 15, and nut 16. Cap 11 is press fitted into one end of inner cylindrical element 12. Cylindrical element 12 is provided with a plurality of longitudinal slots 17 which are closely spaced so as to insure a maximum exposure of the enclosed Geiger tube to ambient nuclear radiation. The remaining end of cylindrical element 12 has an internally threaded portion 18 to cooperate with the mounting attachment of the enclosed Geiger tube (not shown). Cylindrical element 12 is also provided with two recessed areas 19 spaced 180° apart, each accommodating with spring 14 associated therewith. Outer cylindrical element 13 is provided with an inner recessed area 20 which, together with the inner wall of element 13, forms shoulders 21 and 22. When the probe housing unit is assembled screw 15 is inserted in a hole provided in outer cylindrical element 13 and is retained by nut 16.

The Geiger tube probe housing shown in the sole figure operates as follows. In its "shielded" condition, outer cylindrical element is disposed over slots 17 of inner cylindrical element 12 so as to shield the enclosed Geiger tube from ambient radiation. Outer cylindrical element 13 is stopped in its travel over inner cylindrical element 12 in a direction toward cap 11 by the butting of the outer leg of U-shaped spring 14 with recessed shoulder 22 of outer cylindrical element 13. U-shaped spring 14 on the far side of inner cylindrical element 12 has its outer leg pointing the reverse direction so that as outer cylindrical element 13 is withdrawn to expose longitudinal slot 17 to radiation, the outer leg of spring 14 will butt against recessed shoulder 21 and thus stop the travel of outer cylindrical element 13 over inner cylindrical element 12 away from press-fitted cap 11.

One of slots 17 is shown to be slightly elongated in comparison to the other slots. This particular slot accommodates the combination of screw 15 and nut 16 so that, as outer cylindrical element 13 is withdrawn to expose slots 17 to radiation, element 13 will not slip off cylindrical element 12 should spring 14 fail to engage shoulder 21. This nut-screw feature is purely arbitrary and need be included only if production methods suggest its inclusion in the probe housing design.

To facilitate ease of operation, knurled areas 23, 24 and 25 are provided for cylindrical elements 12 and 13.

Figure 2:
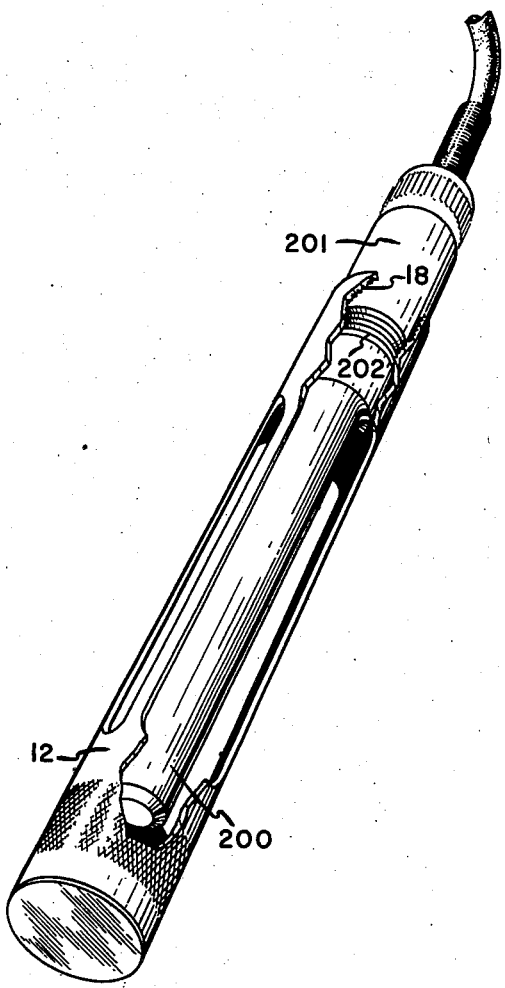
Figure 2 is a cut-away view of a Geiger tube probe mounted in the housing of Figure 1.

In Figure 2 Geiger tube probe 200 is shown inserted in mounting attachment 201 which has thread 202 cooperably engaged with threaded portion 18 of inner cylindrical element 12. Outer cylindrical element 13 hasn't been shown for the sake of clarity of illustration.

It may be noted in passing that in actual practice the enclosed Geiger tube should be enveloped in a thin sheet material, having a high permeability to nuclear radiation, for the purpose of protecting the Geiger tube from moisture, dust and other foreign matter.

It is seen that outer cylindrical element 13 has a minimum of outer protrusions and serves not only as a shield but as a convenient handle for the operator, whether the probe is in its exposed or shielded condition. The omnidirectional feature of inner cylindrical element 12 serves to enhance the sensitivity of the enclosed Geiger tube to a maximum degree. It may be noted also that by reason of springs 14 the present design accomplishes a friction-detent action so that the probe housing will remain in the desired condition.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. A probe housing adapted to enclose a device sensitive to nuclear radiation and to cooperate with a mounting attachment associated with said device, said housing including, in combination, a first hollow element closed at one end and having means at the remaining end for securing said mounting attachment to said first hollow element, said first hollow element having at least one side aperture for exposing said enclosed radiation sensitive device to the ambient field, and a second hollow element disposed over said first hollow element and slidable thereover in either or two opposite lengthwise directions to alternately expose or cover said side aperture as is desired.

2. Apparatus according to claim 1 in which each of said first and second hollow elements has a cylindrical configuration.

3. Apparatus according to claim 1 in which each of said side apertures consists of a longitudinal slot, each slot being closely spaced to an adjacent slot.

4. Apparatus according to claim 3 in which each of said first and second hollow elements has at least one knurled peripheral area.

5. Apparatus according to claim 4 in which said second hollow element is equipped with means adapted to cooperate with one of said slots of said hollow cylindrical element to butt against either end of said slot as said second hollow element is moved from a position covering said slot of said hollow cylindrical element to a position exposing said slot.

6. Apparatus according to claim 5 in which said second hollow element has a small side aperture and said butting means associated with said second hollow element consists of a screw inserted through said aperture provided in said second hollow element and a nut cooperating with said screw.

7. Apparatus according to claim 6 in which said second cylindrical element has inner and outer walls and an internal recess area disposed between the ends thereof, and at least one means associated with said first cylindrical element to butt against a shoulder formed by said internal recess area and said inner wall of said second cylindrical element at a particular disposition of said first cylindrical element with respect to said second cylindrical element.

8. Apparatus according to claim 6 in which said second cylindrical element has an internal recessed area disposed between the ends thereof; said first cylindrical element has a plurality of indentations on its periphery, a plurality of U-shaped springs each having two end portions and each being disposed in one of said indentations such that one end portion of at least one of said U-shaped springs may butt against one shoulder formed by the juncture of said recessed area and said inner wall of said second cylindrical element when said second cylindrical element is withdrawn so as to at least partially expose said slots of said first cylindrical element and one end portion of at least one of said U-shaped springs may butt against the remaining shoulder formed by the juncture of said recessed area and said inner wall of said second cylindrical element when said slots of said first cylindrical element are covered by said second cylindrical element.

9. An omni-directional probe housing according to claim 1 in which said first hollow element has a plurality of side apertures disposed completely about the periphery thereof.

References Cited in the file of this patent

UNITED STATES PATENTS

| 2,617,955 | Mandeville et al. | Nov. 11, 1952 |
| 2,675,483 | Leighton et al. | Apr. 13, 1954 |
| 2,683,234 | Lynch | July 6, 1954 |